United States Patent [19]

Nishikawa

[11] 4,293,051

[45] Oct. 6, 1981

[54] POWER STEERING DEVICE FOR VEHICLES

[75] Inventor: Masao Nishikawa, Tokyo, Japan

[73] Assignee: Honda Giken Kogyo Kabushiki Kaisha, Tokyo, Japan

[21] Appl. No.: 952,097

[22] Filed: Oct. 17, 1978

[30] Foreign Application Priority Data

Oct. 17, 1977 [JP] Japan .............................. 52-124316

[51] Int. Cl.³ .............................................. B62D 5/08
[52] U.S. Cl. .................................... 180/133; 60/405; 180/143
[58] Field of Search ................. 180/133, 143; 60/405; 91/370

[56] References Cited

U.S. PATENT DOCUMENTS

| | | | |
|---|---|---|---|
| 3,613,818 | 10/1971 | Schubert | 180/133 |
| 3,625,240 | 12/1971 | MacDuff | 180/133 |
| 3,747,725 | 7/1973 | Feustel | 180/133 |
| 3,964,566 | 6/1976 | Smith | 180/133 |
| 3,994,361 | 11/1976 | Nishikawa | 180/143 |

*Primary Examiner*—John P. Silverstrim
*Attorney, Agent, or Firm*—Irving M. Weiner; Pamela S. Burt; John L. Shortley

[57] ABSTRACT

A power steering device for vehicles having a main hydraulic pump and a hydraulic motor type vehicle speed sensor, the number of rotation of which is regulated to be proportional to vehicle speed. In order to make a power steering system safe even when the main pump breaks down, and to warn the driver of trouble in the power steering system by the increase of resistance to the steering operation, an emergency switchover device is provided to alter a hydraulic motor functioning as the vehicle speed sensor to a substitute hydraulic power source when a main power source breaks down.

6 Claims, 4 Drawing Figures

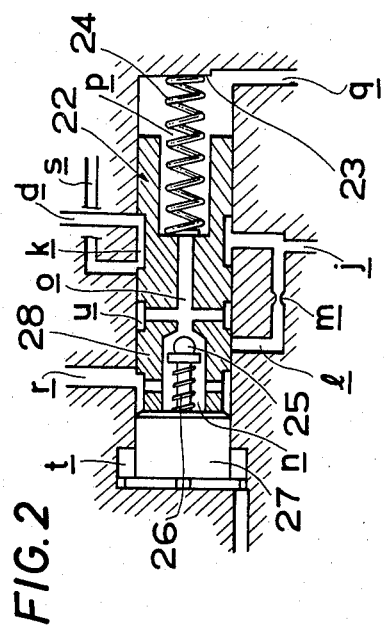

POWER STEERING DEVICE FOR VEHICLES

BACKGROUND OF THE INVENTION

1. Field of the Invention

The present invention relates to an improvement in a power steering device for vehicles, and in particular to a power steering device provided with a hydraulic motor type speed sensor.

2. Description of the Prior Art

Generally, in a power steering device for vehicles, when a hydraulic power source breaks down, a steering system is automatically switched over to a manual steering system to permit safe driving. However, this method is not necessarily satisfactory for a comparatively heavy vehicle such as a large passenger car or truck because there is no power assistance after the steering is switched over to a manual steering system, and an extremely large manual force is required for steering such a heavy vehicle. Thus, smooth steering is hardly possible, which is undesirable from the view point of the safety of the driver.

There has been suggested a system having two power sources with an auxiliary hydraulic pump which is normally idly driven with the engine power and is alternatively switched over to serve as a substitute hydraulic power source when a main hydraulic power source breaks down. However, such system requires two entirely separate hydraulic pumps and necessarily results in increase of costs. Further, even with a system having two power sources, in case the engine stops, both power sources will stop operation at once and the auxiliary hydraulic pump and its channel will become useless.

As an improved system for the above, it has been considered to drive the auxiliary hydraulic pump with a shaft such as a counter-shaft of a transmission, which rotates at the number of rotations proportional to the vehicle wheel, instead of the engine. However, in case the main pump and channel are complete, power loss will be caused with driving of the auxiliary pump. Also, because the auxiliary pump is always driven, the oil temperature will be raised, to thus deteriorate the hydraulic oil.

In such a power steering device system having two power sources, presupposing trouble with the main power source, it is not sufficient that only the remaining power source superseding the broken down power source is used alone. Thus, it is further required to provide a system for detecting trouble with a power source and warning the driver of same. However, such warning system is required to be more reliable than the power steering system itself. Thus, if this warning system is attached to the two power sources system and the reliability is made high, the thus constructed power steering device will be so costly as not to be an economical and useful device in practice.

The present invention effectively solves the problems described above by taking into account the following considerations.

At the present, there are various kinds of systems for controlling the flow gain of the hydraulic oil with the change of the vehicle speed and adjusting the steering to be hard with the increase of the vehicle speed, which systems are incorporated in the conventional power steering devices. In general such systems drive a vehicle speed sensor by a shaft rotated at the number of rotations proportional to the vehicle wheel, such as a counter-shaft of a transmission. Therefore, if this speed sensor can be utilized as a second hydraulic power source so that, in case a main hydraulic power source breaks down, the speed senser may be automatically converted to a substitute power source, a desirable power steering device will be attained with ensuring the safety and reliability and satisfying economical requirements by utilizing the existing equipment.

SUMMARY OF THE INVENTION

An object of the present invention is to provide a power steering device provided with a two power sources system, which requires no additional separate hydraulic sensor. The invention attains emergency power assistance without making great changes in a hydraulic system, and which has a simple and economical structure.

Another object of the present invention is to provide a power steering device wherein, in case either one of a main hydraulic power source driven by an engine or a vehicle speed sensor driven by a counter-shaft or the like breaks down, the force required for steering operation during running is safely unchanged. During stopping of the vehicle the steering force required becomes extraordinarily heavy so that the driver may sense trouble with the hydraulic power system without requiring any special warning system.

The present invention provides a power steering device having a hydraulic motor type vehicle speed sensor in addition to a main hydraulic pump, and including an emergency switching means for switching the vehicle speed sensor to a substitute hydraulic power source when the main hydraulic pump breaks down.

Further, the present invention provides a power steering device wherein a pressure control valve for changing the resistance of fluid against a directional control valve with the change of vehicle speed serves as an emergency switching means for switching over to a substitute power source when a main hydraulic power source breaks down.

A preferred embodiment of the present invention is described in detail below with reference to the accompanying drawings.

BRIEF DESCRIPTION OF THE DRAWINGS

FIG. 2 is a partially enlarged view showing the position of a pressure control valve at the time when a main hydraulic power source breaks down.

DETAILED DESCRIPTION

Figure 1:
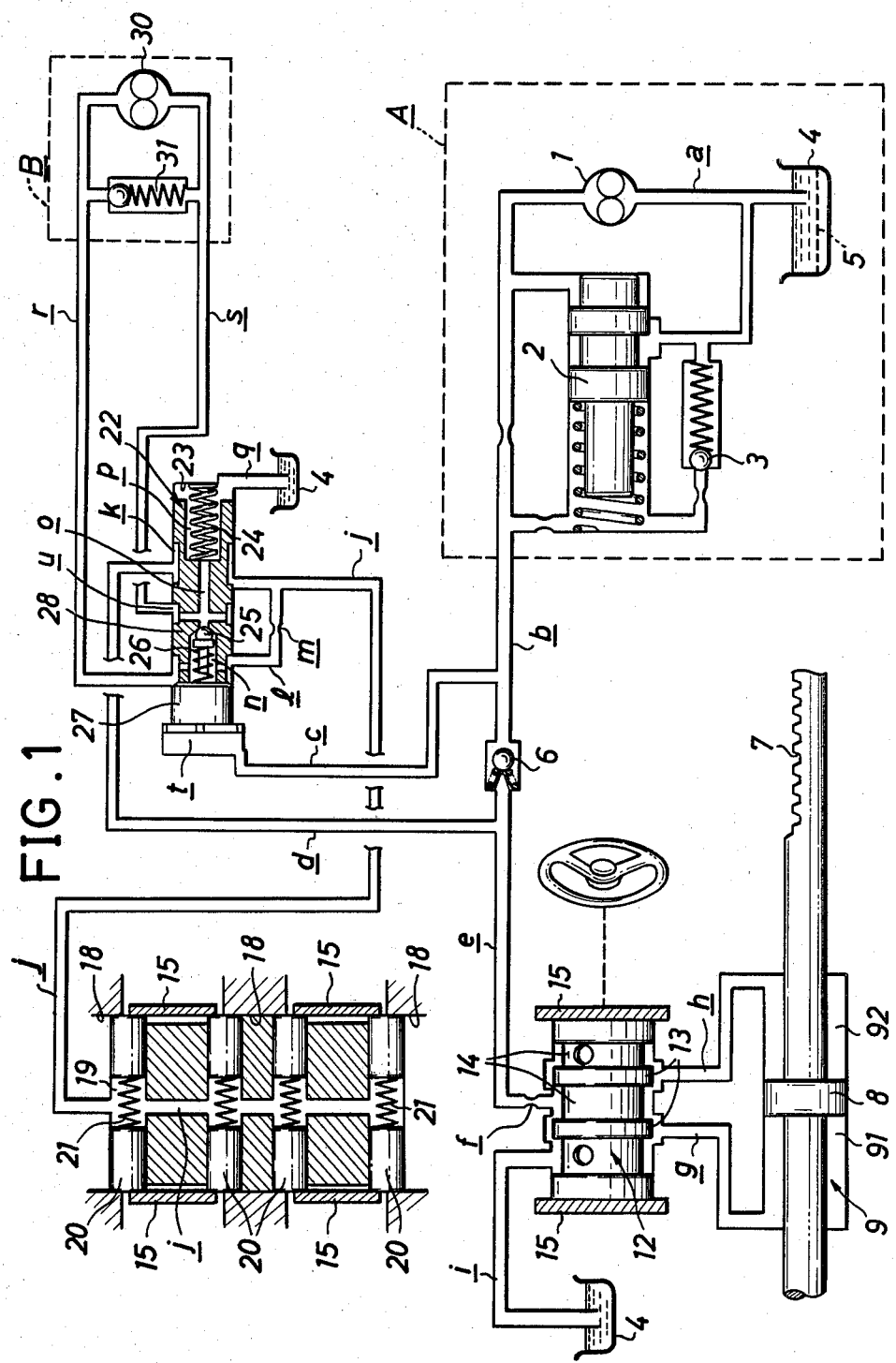
FIG. 1 is a schematic view of a power steering device according to the present invention, in the normally-operating and straight-advancing state.
Figure 4:
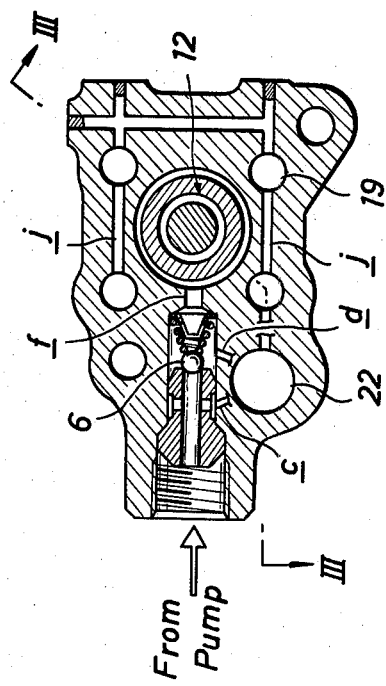
FIG. 4 is a view taken along line 4—4 in FIG. 3.

Referring to FIG. 1, an engine-operated main hydraulic oil pump 1 functions as a main hydraulic power source A of a power steering device of the invention. A gear 1A of main pump 1 is driven by an engine (not shown) of the vehicle in a well known manner. Pump 1 is connected on the suction side with an oil tank 4 provided therein with an oil filter 5, through a pump line a. A pipe line b is connected to the delivery side of pump 1. A flow control valve 2 and a pilot relief valve 3 are interposed between pipe lines a and b.

A check valve 6 is interposed so as to open downstream in the extension of pipe line b on the delivery side. A branch pipe line c is provided on the upstream side of check valve 6. A pipe line d provided on the downstream side of check valve 6 is provided with a branch pipe line e for selectively feeding a working fluid to a cylinder through a directional control valve of a steering gear box, described in detail hereinbelow. Provided in pipe line e is an orifice f for throttling the fluid to be fed to the directional control valve.

Figure 3:
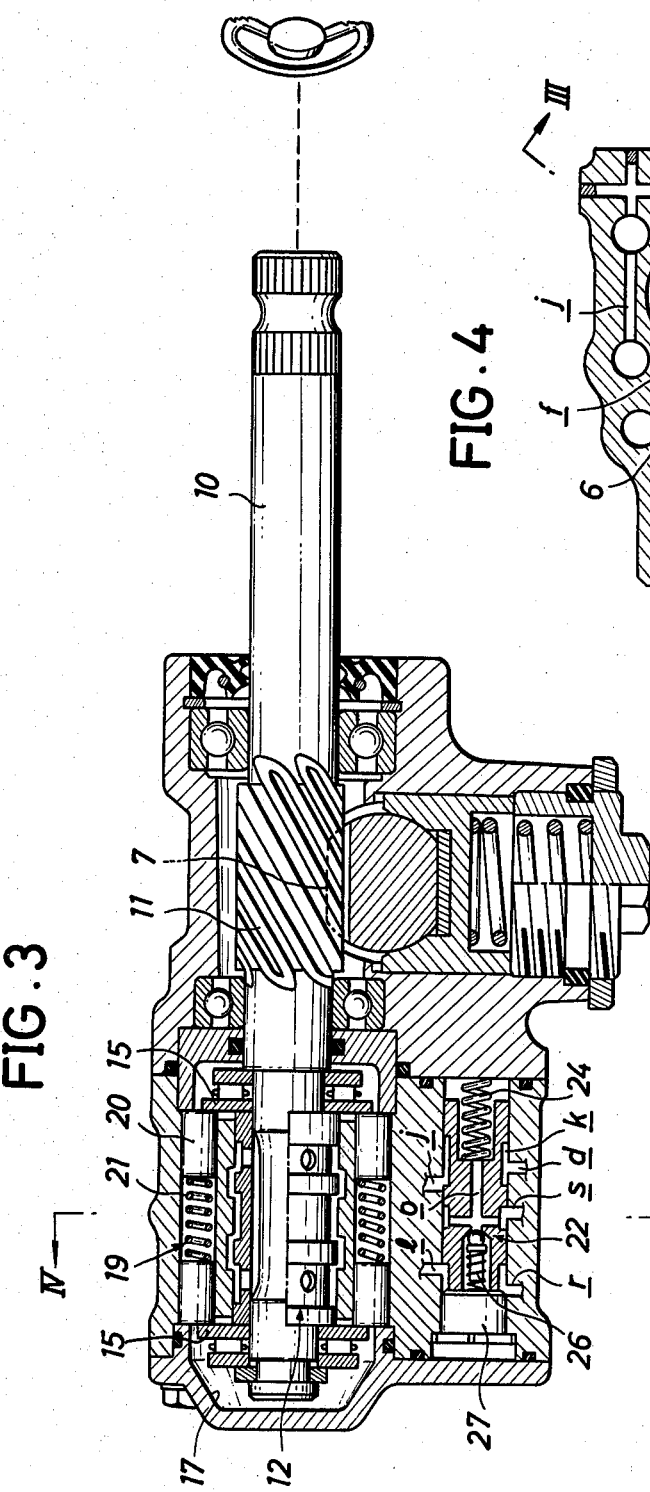
FIG. 3 is a sectioned side view showing the arrangement of the pressure control valve and associated structure in accordance with the present invention.

The steering gear box is a rack and pinion type by way of example, which is shown in FIGS. 1 and 3. A steering shaft 10 is provided thereon with a helical pinion 11 which meshes with a helical rack 7 formed on a shaft which is also provided with a piston 8 axially slidable within cylinder 9. The steering torque applied to shaft 10 may be converted to a thrust in the axial direction by the helical angle between the pinion 11 and rack 7 so as to be transmitted to a directional control valve 12 formed at the front end of shaft 10.

Directional control valve 12 is a spool type four-way valve by way of example. When valve 12 is moved forwardly or (toward end wall 17) rearwardly from the center position as illustrated, by the clockwise or counter-clockwise rotation of steering shaft 10, the working fluid may be selectively fed to or discharged from either one of chambers 91 and 92 in the front and rear of piston 8 in cylinder 9 by the changes of positions of lands 13 and grooves 14 with the forward or rearward movements of valve 12. Rack 7 is thereby moved rightwardly or leftwardly and the steering operation is assisted. Branch pipe e is connected to valve 12 and pipe lines g and h are connected respectively to chambers 91 and 92. Also provided is a return pipe line i connected with tank 4.

Hydraulic reaction chambers 19 are arranged around valve 12 and a pair of front and rear plungers 20 provided with compression springs 21 therebetween are provided within each reaction chamber 19. Plungers 20 in reaction chambers 19 are partially held between flange-like stoppers 15 radially extending from the front and rear ends of valve 12, and are also partially held between opposed end walls 18 of chamber 19. In FIG. 1, four reaction chambers 19 are shown as developed in plan, but in fact are provided so as to surround valve 12. Respective reaction chambers 19 communicate with each other through a passage j and are kept under the same pressure.

Communicating passage j is connected to the delivery side of hydraulic pump 1 through a pressure control valve 22 provided with a peripheral groove k connecting pipe line d with passage j so that, at the time of normal operation of main pump 1 as shown, the fluid may be fed to groove k of valve 22 through pipe line d, with passage j and chambers 19 being kept under the same pressure. Valve 22 is resiliently urged toward the central opening position by a spring 24 interposed between valve 22 and the end wall 23 of the chamber but is also urged toward the closing position by the fluid pressure on the downstream side of an orifice m provided in a branch pipe line l led from passage j. As such, valve 22 is normally held in the illustrated center valve position.

Valve 22 is further provided with a chamber n which communicates with branch pipe line l and with a passage o provided within valve 22, but is normally interrupted from passage o by a one-way valve 25 urged by a spring 26. Passage o is connected to return passage i through a chamber p on the other side of valve 22 and through a pipe line q.

Pipe line l is connected through chamber n and a pipe line r to the suction side of a hydraulic motor 30 of a vehicle speed senser B, which is connected on the delivery side to passage o through a pipe line s to form a return passage. A relief valve 31 to be opened under a low pressure is provided between pipe lines r and s of motor 30.

A piston 27 holding valve 22 in the illustrated fixed position, against movement thereof to a first end position, is provided on the chamber n side of valve 22. The outer end of piston 27 which is provided with a flange is positioned within a chamber t communicating with the upstream branch pipe line c of check valve 6 so that piston 27 is forced and kept rightward in the drawing by the head pressure of the fluid produced at orifice f of pipe line e.

An output shaft of motor 30 functioning as a vehicle speed sensor B connected to pressure control valve 22 meshes with a counter-shaft of a transmission (not illustrated) through a gear so as to rotate at the same number of rotations as the vehicle wheel.

The operation is as follows. The working fluid of main pump 1 is fed to directional control valve 12 through pipe line b, check valve 6 and branch pipe line e, and is throttled by orifice f provided in branch pipe e to produce a pressure head of, for example, 2 to 3 atmospheres. The fluid pressure downstream of orifice f acts on the regulating piston 27 of valve 22 through pipe line c. The fluid pressure upstream of orifice f acts on reaction chamber 19 through downstream pipe line d, groove k and passage j. If the flow characteristic of flow control valve 2 of pump 1 is so predetermined that the flow somewhat increases with the number of the rotations of pump, the pressure head at orifice f will increase slightly and the pressure in the reaction chamber will also be somewhat raised thereby developing a favorable result, in the high rotational range of the engine.

The fluid fed to reaction chambers 19 is led to pipe line r through control valve 22 from downstream of orifice m so as to drive motor 30, from the delivery side of which the fluid is led to return passage i to tank 4 through pipe line s, valve 22 (groove u, passage o, chamber p) and pipe line q. Motor 30 is driven by the counter-shaft and is rotated by the downstream pressure of orifice m. The number of rotations of motor 30 is regulated by the counter-shaft so as to be proportional to the vehicle speed. Thus, if the vehicle speed increases, motor 30 will rotate more than the flow passing through orifice m in pipe line l to produce a negative pressure in pipe lines l and r but one-way valve 25 in control valve 22 will open and the fluid in pipe line s will be led to chamber n to recover the negative pressure. When the vehicle is driven in reverse, motor 30 functions as a power source to feed the fluid into reaction chambers 19 through courses r, n and l so that the resistance to the forward and rearward movements of shaft 10, i.e., to the motion of the valve 12, which are moved against spring 21 between plungers 20, becomes large. Therefore, and further because the caster angle of the steered wheels becomes negative when using the reverse gear, the steering shaft becomes difficult to rotate. However, in such case, relief valve 31 opens because of a negative pressure in pipe line s to ensure smooth steering.

There has already been described in U.S. Pat. No. 3,994,361 the operation of speed sensor B, the forward and rearward movements of directional control valve 12 by the rotation of steering shaft 10, the power assistance made by feeding and discharging the working oil to chambers 91 and 92 of cylinder 9 through valve 12 and the operation of hydraulic reaction chambers 19. Only the function of vehicle speed sensor B itself is described below.

In the straight advancing states as shown in FIG. 1, directional control valve 12 forms a so-called open center valve which freely allows the working fluid of pump 1 to return to tank 4 through the courses b, d, f, e and i, and the fluid delivered from pump 1 is compressed only by the forward and rearward movements of control valve 12, caused by the steering. The compressed fluid is led into respective hydraulic reaction chambers 19 through pressure control valve 22 and is led also to motor 30 by courses l, n and r through orifice m. The amount of the fluid fed to motor 30 increases in proportion to the pressure in reaction chamber 19. However, when the amount fed to motor 30 increases so much as to be equal to the amount consumed by motor 30, the one-way valve 25 is closed. When the pressure in reaction chamber 19 further increases and the amount fed to the motor also further increases, a rightward force acts on pressure control valve 22 to move it further rightward to a closed second end position against the resiliency of spring 24 so that the communication of pump 1 with reaction chamber 19 may be interrupted and, even if the pressure in cylinder 9 increases, the pressure in reaction chamber 19 may not increase but may become constant. Thus, when the vehicle speed is fixed, the steering force is retained by the pressure in the reaction chamber at a fixed value corresponding to the vehicle speed. This value is maintained low while the car is stopping but increases with the increase of the vehicle speed so as to attain a steering force proportional to the vehicle speed.

The pressure control valve of the invention, provided between hydraulic power source A and vehicle speed sensor B, serves as a switchover valve in an emergency and such operation of the valve is described below.

Pressure control valve 22 is separably provided e.g., at the left end in the drawing, with piston 27 urged rightward by the head pressure of orifice f so that, during the running of pump 1, valve 22 may not move leftward from the position shown in FIG. 1 to function as the pressure control valve itself which opens to make communication between pump 1 and reaction chamber 19 by spring 24 and closes by the downstream pressure of orifice m.

However, when the running of pump 1 is stopped due to breaking of the driving belt or the like, the flow through orifice f will become zero and the head pressure will vanish. As a result, the pressure in the chamber t, acting through piston 27 on valve 22 against spring 24 will vanish, and the valve 22 and piston 27 will move leftwardly from the state in FIG. 1 under the action of the spring 24 to a first end position as shown in FIG. 2.

In this leftward position of valve 22, groove k connects passage s on the delivery side of motor 30 with the upstream pipe line d of orifice f and with reaction chamber 19 so that the flow and pressure required for directional control valve 12 are fed to valve 12 by motor 30 driven proportionally to the vehicle speed. Namely, by the stop of main pump 1, valve 22 is switched to alter motor 30 to a pump which feeds the working fluid to valve 12 and assists the power without fail. Because motor 30 is provided as a vehicle speed sensor, when the power loss of the engine is considered, the motor is designed to have a small capacity and therefore, in order to assist the power with only motor 30 as mentioned above, the flow through orifice m for leaking the fluid from reaction chamber 19 has to be saved. Therefore, when valve 22 is switched, courses l and r are interrupted by land 28 and all the delivery from motor 30 is effectively fed to cylinder 9. The suction of motor 30 is made through pipe line q, chamber p, passage o, chamber n and pipe line r by opening one-way valve 25. The piping between pump 1 and valve 12 of the gear box is usually made of a rubber hose flexed to absorb the noises of the pump and having the characteristic of an accumulator to be somewhat expanded with the pressure. Therefore, in case motor 30 is alternated as a pump in such an emergency, the flow will be small, the operation delay will be caused by the accumulator characteristic of the hose and the steering will be impaired. To avoid this, in an emergency, the hose is interrupted from the delivery side of motor 30 by the close of check valve 6 provided downstream of pipe line b corresponding to this hose. Because piston 27 is operated by the upstream pressure of check valve 6, even if motor 30 starts the alternative operation in an emergency, the fluid will not be fed through courses c and t due to closed check valve 6, and the leftward movement of piston 27 will be held.

Consequently, in case the main hydraulic power source A breaks down, valve 22 will be switched, and hydraulic motor 30 of vehicle speed sensor B will alternatively function as a substitute hydraulic power source. In other words, the pressure control valve will function as a switchover valve for switching the hydraulic power source in case of an emergency.

Due to this operation of valve 22, the steering force will not substantially vary and the steering will be able to be effected naturally during the running of the vehicle. However, when the vehicle speed reduces, the capacity of motor 30 goes down and the delivery becomes short so that the steering may be felt to gradually become hard. When the vehicle stops at last, the input to the motor of the vehicle speed sensor stops and the power assistance is interrupted. As a result, the driver can positively sense the trouble in the power steering system. In other words, the increase of the steering resistance warns the driver of the trouble in the hydraulic power source.

The trouble on the vehicle speed sensor side with the main pump being complete, is described below. A first example of the trouble with speed sensor B is an increase of the internal leakage due to wear by long use. In this case, the fluid is continuously led to pump 30 irrespective of vehicle speed, and the flow passing through orifice m connected to pump 30 through pipe line r increases so that valve 22 moves in the same manner as during the high speed running. Even during stopping, the pressure in the reaction chamber is still kept high, therefore the steering is hard and the abnormal state of the power steering system can be sensed from such extraordinary steering. A second example is the deformation of one-way valve 25 or relief valve 31 caused by a strike against the valve seat or the like. In this case, the sealability of this part is deteriorated and the flow passing through orifice m also increases by the leakage described so that the same result as above is achieved. Because the gear box is provided on the vehicle body side and the speed sensor is on the engine side (transmission side), the piping between them is generally made of a rubber hose. Therefore, in case the rubber hose breaks and the working fluid leaks out, as described above, the flow passing through orifice m increases and the same result as above is achieved.

Consequently, any trouble occurring on the vehicle speed sensor side will make the steering hard while safety is retained. Thus, according to the present invention, even if either of the main hydraulic power source or the vehicle speed sensor breaks down, the steering sense will become hard while the safety during vehicle running is ensured and the trouble will be sensed to warn the driver.

Although the present invention has been described with reference to the rack and pinion type steering box, the steering gear box is not limited to such rack and pinion type as illustrated in the drawing.

I claim:

1. In a power steering device for vehicles having a directional control valve movable in either one of two directions in accordance with the turning of a steering shaft so that an oil passage connected to a delivery side of an engine-operated main hydraulic pump is selectively connected to one of two chambers of a hydraulic cylinder, a hydraulic motor driven in proportion to vehicle speed while being supplied with pressure fluid from said main pump, a pressure control valve being arranged so as to modify the flow of pressure fluid from said main pump in accordance with the rotation of said hydraulic motor, a plurality of hydraulic reaction chambers arranged around said directional control valve and operatively cooperating therewith so as to resist movement of said directional control valve in either direction, said hydraulic reaction chambers being supplied with pressure fluid from said main pump modified by said pressure control valve so as to vary the resistance to movement of said directional control valve in accordance with vehicle speed, the improvement comprising:

means for switching over to use of said hydraulic motor as a substitute power source in response to significant reduction or interruption of oil supply from said main pump, including:

a pipe line (c) connected between the delivery side of said main pump and said pressure control valve for supplying fluid under pressure from said main pump to normally hold said pressure control valve against movement to a first end position thereof and to permit said pressure control valve to move to said first end position thereof upon any significant reduction or interruption of said main pump supply through said pipe line (c);

a communicating passage (j) arranged so as to provide communication between said hydraulic reaction chambers;

a groove (k) provided in said pressure control valve; and a delivery side of said hydraulic motor being connected through said groove (k) of said pressure control valve with said communicating passage (j) and a pipe line (d) connected with said directional control valve when said pressure control valve is released to move to said first end position thereof.

2. A device according to claim 1, wherein:

said hydraulic reaction chambers are arranged to communicate with a branch passage having a throttle so as to drive said hydraulic motor with the suction of the compressed downstream fluid of said throttle; and said pressure control valve in said first end position thereof closes off said compressed downstream fluid of said throttle to interrupt the communication between said throttle and the suction side of said hydraulic motor while said switchover means is in operation.

3. A device according to claim 1, wherein a check valve is provided to prevent the delivery pressure of said hydraulic motor from acting on the upper stream of a pipe line led from said main pump to other elements of said power steering system while said emergency switchover means is in operation.

4. A device according to claim 1, wherein:

said pressure control valve is disposed within a valve chamber;

a spring (24) is interposed between said pressure control valve and said valve chamber for resiliently urging said pressure control valve towards an open central position thereof wherein said communicating passage of said hydraulic reaction chambers communicates through said groove of said pressure control valve with the delivery side of said main pump during normal operation of said main pump;

a pipe line (l) is led from an interior portion of said valve chamber to said communicating passage (j), said pipe line (l) being provided with an orifice (m) therein;

said pressure control valve is urged towards a closed second end position thereof by fluid pressure on the downstream side of said orifice (m);

said pressure control valve has a chamber (n) which communicates with said pipe line (l) and with a passage (o) in the interior of said pressure control valve;

said chamber (n) is normally blocked from said internal passage (o) by a one-way valve (25) urged by a spring (26) within the interior of said pressure control valve; and said internal passage (o) is connected to a return passage (i) through a chamber (p) in which said spring (24) is disposed, and through a pipe line (q) communicating with said hydraulic reaction chambers.

5. A device according to claim 4, wherein:

said pipe line (l) is connected through said chamber (n) and a pipe line (r) to the suction side of said hydraulic motor (30) of said vehicle speed sensor (B); and said hydraulic motor (30) is connected on its delivery side to said internal passage (o) of said valve (22) through a pipe line (s) which forms a return passage for said hydraulic motor (30).

6. A device according to claim 1, wherein:

a piston (27) is provided adjacent said pressure control valve in a chamber (t) which communicates with said pipe line (c), said piston normally holding said pressure control valve against movement to said first end position thereof; and said piston is released to move, together with said valve, to said first end position upon any significant reduction or interruption of said main pump supply through said pipe line (c).

* * * * *